F. A. BODE.
FLOWER VASE.
APPLICATION FILED NOV. 3, 1915.
1,200,459.
Patented Oct. 10, 1916.
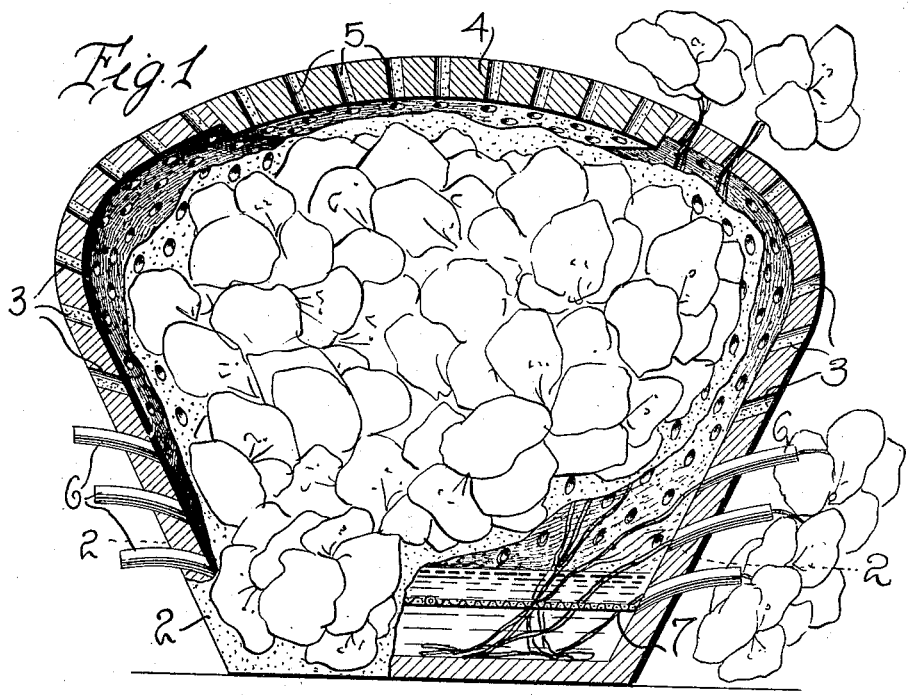
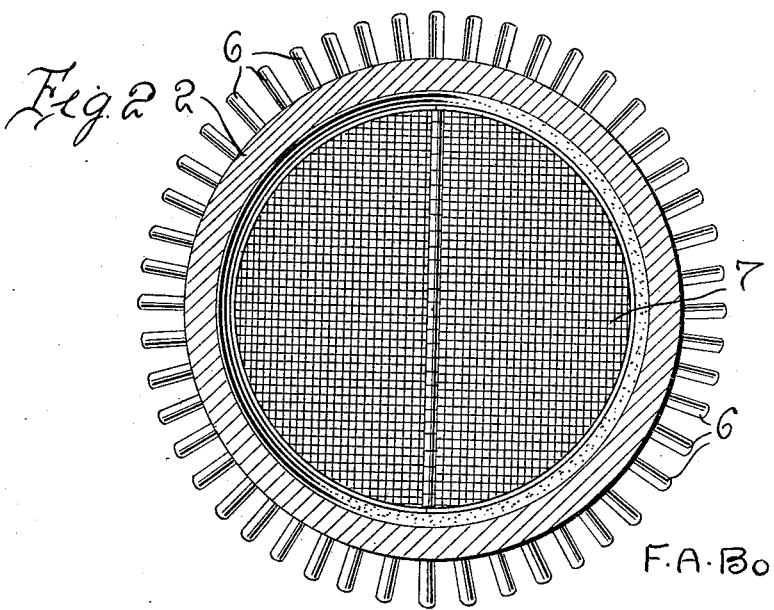
Inventor
F. A. BODE
By Watson E. Coleman
Attorney

UNITED STATES PATENT OFFICE.

FREDERICK A. BODE, OF SAN DIEGO, CALIFORNIA.

FLOWER-VASE.

1,200,459.  Specification of Letters Patent.  Patented Oct. 10, 1916.

Application filed November 3, 1915. Serial No. 59,397.

*To all whom it may concern:*

Be it known that I, FREDERICK A. BODE, a citizen of the United States, residing at San Diego, in the county of San Diego, and State of California, have invented certain new and useful Improvements in Flower-Vases, of which the following is a specification, reference being had to the accompanying drawings.

This invention relates to vases for containing flowers, and the primary object is the provision of a vase so constructed that the flowers may be supported therein so that the flowers will extend radially outward from the vase in nearly all directions, thereby doing away with the necessity of making up moss baskets wherein the cut flowers are stuck into the moss, this sticking of the cut flowers into the moss involving a lot of work and rendering the flowers liable to fade before use.

A further object of the invention is the provision of a vase which is fairly low so that it may be used as a center piece for dinner tables, being provided with a perforated lid and formed with holes in its sides and through the lid, through which the stems of the flowers may be inserted, the lower portion of the vase being imperforate so that it may be filled with water.

A further object of the invention is to provide in connection with the vase of the character above described, a supporting member having the form of a wire screen disposed in the bottom of the vase and through which the stems of the flowers may be inserted.

A further object of the invention is to form a vase with guiding tubes on the side wall thereof so that the flowers may be inserted from the side of the vase and have their stems dip into the water in the vase while the flowers themselves are disposed relatively near to the base of the vase.

Other objects will appear in the course of the following description.

My invention is illustrated in the accompanying drawing, wherein:

Figure 1 is an elevation of a vase constructed in accordance with my invention, the side walls of the vase being partly in section and the cover being in section; Fig. 2 is a section on the line 2—2 of Fig. 1.

Referring to this drawing it will be seen that the body 2 of the vase is imperforate at its lower portion to contain water and that above the water level the side wall of the vase is formed with a plurality of perforations 3, these perforations extending approximately radially from the vase. The vase at its top is formed with a relatively large opening which is normally closed by a lid 4 also formed with perforations 5. Preferably, the lower openings 3 are provided with outwardly extending spouts or tubes 6 extending outward and upward, these tubes being curved. The tubes may extend interiorly of the vase, if desired, but this is not absolutely necessary. Disposed in the bottom of the vase near or below the water level is a stem support consisting of a screen of wire, this screen being designated 7. The screen is preferably made in two parts so it may be inserted through the opening in the top of the vase or removed therefrom in order to permit the interior of the vase to be cleaned. This screen is designed to engage with and support the lower edge of the flower stems and hold the flower stems with their lower ends below the water line.

The use of my invention will be obvious from what has gone before. The vase is to be filled with water to just below the lowermost holes 3 and then the lid placed in position thereon. The flowers may now be inserted through the openings in the lid and through the openings in the side wall of the vase and their stems disposed through the screen. The tubes or spouts 6 being curved downward cause the stem to also curve downward but dispose the flower around the base of the vase. If the vase is provided with a suitable number of holes and a sufficient number of flowers are disposed with their stems through the vase, the flowers may be arranged to completely cover the vase and form practically a mound of flowers, the tubes 6 acting to hold certain of the flowers with their blossoms around the base of the vase. Thus the vase is hidden by the flowers but the stems are held in the water.

I do not wish to be limited to any particular form of vase, character of its ornamentation, or the material from which it is made, as the vases might be made of glass, earthenware, porcelain, or even of sheet metal. The form of the vase will of course vary in the use to which it is put.

Having thus described the invention, what is claimed is:

1. A flower vase having a water holding base portion and a side wall extending inward at its upper end, the upper end of the side wall defining a relatively large filling opening, the side wall of the vase from a point adjacent the level of the water held in said base being formed with a plurality of uniformly spaced radiating perforations, a lid normally closing said filling opening and also uniformly perforated, and means disposed adjacent the base for engaging the stems of flowers disposed through said perforations.

2. A flower vase having an imperforate base portion, the wall of the vase extending upward and defining a circular filling opening, said wall above the imperforate base portion being formed with a plurality of uniformly spaced upwardly directed perforations, a lid normally closing the filling opening and formed with uniformly spaced upwardly directed perforations, certain of the openings or perforations adjacent the base of the vase being formed with upwardly directed spouts whereby to support the stems of flowers and support the flowers on said stems in predetermined relation to the vase.

In testimony whereof I hereunto affix my signature in the presence of two witnesses.

FREDERICK A. BODE.

Witnesses:
J. B. Pendleton,
L. G. Pendleton.

Copies of this patent may be obtained for five cents each, by addressing the "Commissioner of Patents, Washington, D. C."